(12) United States Patent
Alcazar

(10) Patent No.: US 11,024,178 B2
(45) Date of Patent: Jun. 1, 2021

(54) SYSTEM AND METHOD FOR AUTONOMOUSLY STEERING A VEHICLE

(71) Applicant: Continental Automotive Systems, Inc., Auburn Hills, MI (US)

(72) Inventor: Javier Alcazar, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 324 days.

(21) Appl. No.: 16/141,237

(22) Filed: Sep. 25, 2018

(65) Prior Publication Data

US 2019/0096257 A1    Mar. 28, 2019

Related U.S. Application Data

(60) Provisional application No. 62/562,871, filed on Sep. 25, 2017.

(51) Int. Cl.

| | |
|---|---|
| *G08G 1/16* | (2006.01) |
| *B62D 15/02* | (2006.01) |
| *B60W 30/12* | (2020.01) |
| *G06K 9/00* | (2006.01) |
| *G05D 1/02* | (2020.01) |
| *B60W 40/076* | (2012.01) |

(52) U.S. Cl.
CPC .......... *G08G 1/167* (2013.01); *B60W 30/12* (2013.01); *B60W 40/076* (2013.01); *B62D 15/025* (2013.01); *G05D 1/0212* (2013.01); *G05D 1/0231* (2013.01); *G06K 9/00798* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 2014/0277945 A1* | 9/2014 | Chandy | B62D 15/025 701/42 |
| 2015/0298694 A1* | 10/2015 | Park | B60W 10/18 701/41 |
| 2018/0037260 A1* | 2/2018 | Otake | B62D 15/025 |
| 2019/0196496 A1* | 6/2019 | Yamamoto | G06F 16/29 |

OTHER PUBLICATIONS

Evidence of well known formula of centripetal force in attachment (Year: 2020).*
Evidence of well known acceleration down an incline plane formula in attachment (Year: 2020).*

* cited by examiner

*Primary Examiner* — Nicholas K Wiltey

(57) ABSTRACT

A method and system for controlling a vehicle along a curved roadway, including receiving vehicle sensed data relating to vehicle operation and/or vehicle position and orientation; identifying first and second lane markers from the sensed data; determining a reference path for the vehicle using the lane markers; calculating a feed-forward control output based upon the curvature of the lane markers; calculating a lateral position of the vehicle relative to the reference path, and a lateral position error based upon the lateral position; and calculating a vehicle heading angle based upon the vehicle sensed data, and a heading angle error. A feedback control output is calculated using a non-linear control function based upon the lateral position error, the heading angle error, and the sensed velocity. A steering control output is generated for steering the vehicle, based upon the feed-forward control output and the feedback control output.

18 Claims, 6 Drawing Sheets

SYSTEM AND METHOD FOR AUTONOMOUSLY STEERING A VEHICLE

CROSS REFERENCE TO RELATED APPLICATION

The present application claims the benefit of U.S. provisional application 62/562,871, filed Sep. 25, 2017, entitled "System and Method for Autonomously Controlling a Vehicle," the content of which is hereby incorporated by reference herein in its entirety.

FIELD OF INVENTION

The present invention generally relates to autonomously controlling a vehicle, and particularly to a system, controller, software program and method for controlling a vehicle along a curved roadway segment.

BACKGROUND

Vehicles with autonomous driving capabilities are becoming increasingly common. Such vehicles possess, among other things, functionality to autonomously steer the vehicle. Existing approaches for autonomously steering a vehicle utilize well known linear control theories, such as proportional integral derivative (PID) control loops and linearization methods using Jacobian and Taylor series expansions. Such existing approaches are relatively complex and utilize a large number of vehicle parameters, each of which must be tuned to the particular vehicle. As a result, it typically take a nontrivial amount of time to tune the vehicle parameters before an existing autonomous vehicle steering function may be used.

SUMMARY

A nonlinear control function is used to generate a steering control command for autonomously steering a vehicle. The nonlinear control function utilizes less vehicle parameters found in existing linear control functions. As a result, the time needed to tune the vehicle parameters in the nonlinear control function is significant less than the time for tuning vehicle parameters used in linear control functions of existing steering control systems.

In accordance with example embodiments, there is disclosed a method, system and software product for controlling a vehicle on a roadway. In an example embodiment, the method includes receiving vehicle sensed data relating to the operation of the vehicle, the vehicle sensed data including a sensed velocity of the vehicle; identifying a first lane marker and a second lane marker of the roadway based upon the sensed data; determining a reference path for the vehicle based at least in part upon the first and second lane markers; calculating a feed-forward control output based at least in part upon a curvature of the first lane marker and a curvature of the second lane marker; calculating a lateral position of the vehicle relative to the reference path based at least partly upon the vehicle sensed data, and a lateral position error based upon the lateral position; calculating a heading angle of the vehicle relative to the reference path based at least partly upon the vehicle sensed data, and a heading angle error based at least partly upon the heading angle; calculating a feedback control output using a nonlinear control function which is based at least partly upon the lateral position error, the heading angle error, and the sensed velocity of the vehicle; generating a vehicle steering control output based upon the feed-forward control output and the feedback control output, the vehicle control output for steering the vehicle; and autonomously steering the vehicle based at least partly upon the vehicle steering control output.

The method may further include calculating a banking angle of the roadway based upon the vehicle sensed data; and calculating a disturbance compensator output based upon the banking angle calculated, wherein generating the vehicle steering control output value is based upon the disturbance compensator output. The disturbance compensator output value may follow a disturbance compensator control function that is based upon the banking angle and the velocity of the vehicle.

The method may further include calculating a curvature of the first lane marker and a curvature of the second lane marker, wherein the feed-forward control output follows a feed forward control function that is based upon an average of the curvature of the first lane marker and a curvature of the second lane marker.

The feedback control output may be based upon the heading angle of the vehicle, a heading angle error, the lateral position of the vehicle, a lateral position error, the velocity of the vehicle, and a control subfunction. The control subfunction may be at least one of an exponential function of the heading angle error, a cosine function of the heading angle error, a sin c function of the heading angle error, and an absolute value function of the heading angle error. In another example embodiment, the feedback control output is based upon the heading angle error and the lateral position error.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiments is merely exemplary in nature and is in no way intended to limit the invention, its application, or uses.

The example embodiments presented herein are generally directed to a system, controller, software product, and method for autonomously controlling a vehicle. Sensed data pertaining to the orientation and (lateral) position of the vehicle with respect to lane markers of a roadway is utilized to generate a steering control command for execution by the vehicle in order to reach the desired or target orientation and position of the vehicle. The sensed data may include sensed lane markers of the roadway on which the vehicle is traveling. A nonlinear control function is used to generate the steering control command. Advantageously, the nonlinear control function requires significantly fewer vehicle parameters needing to be tuned. The example embodiments provide for enhanced steering control of a vehicle when traveling along a curved segment of a roadway and when changing lanes along a straight roadway segment.

Figure 1:
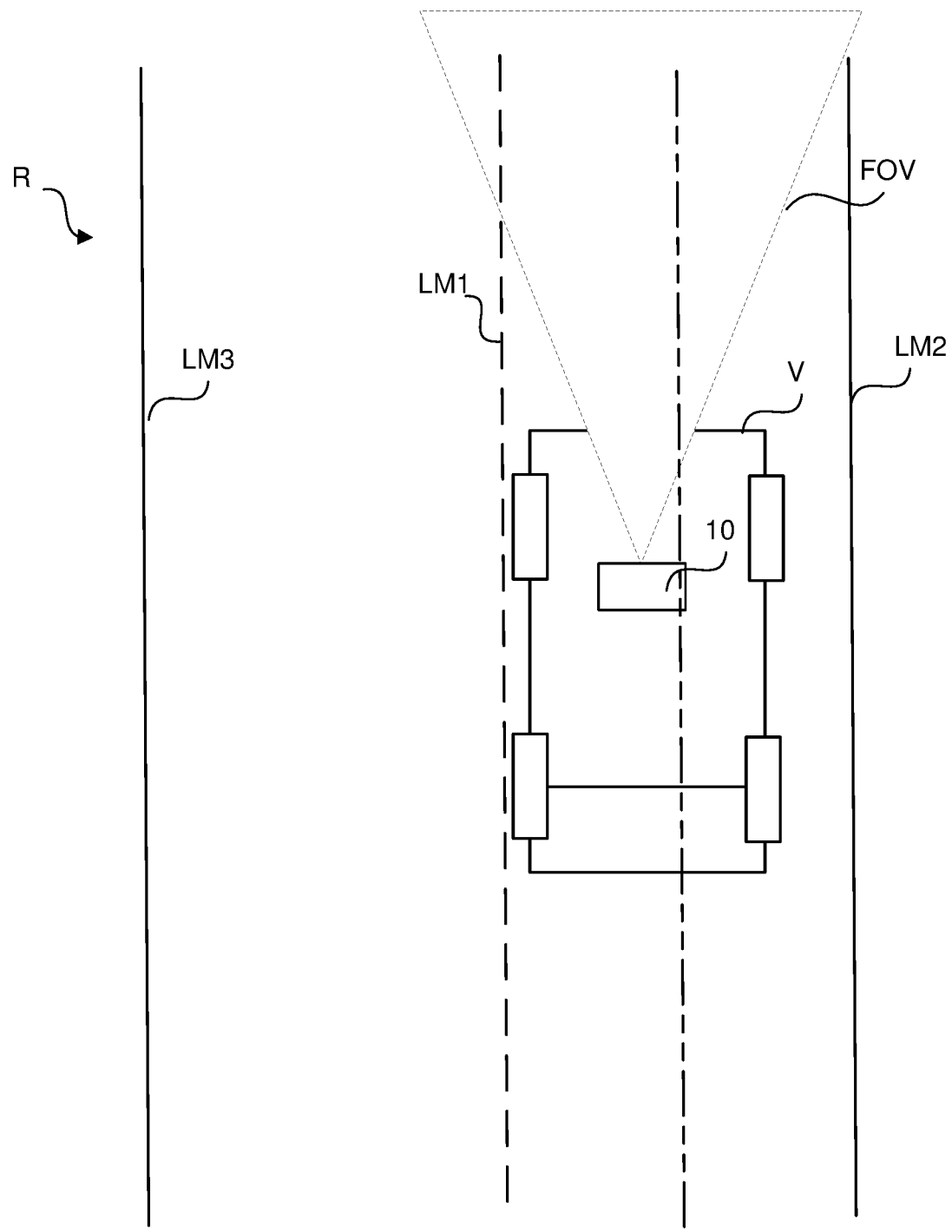
FIG. 1 is an overhead illustration of a vehicle on a roadway having a vehicle control system according to an example embodiment.

FIG. 1 illustrates a vehicle V traveling on a roadway R. In this drawing, roadway R is a two lane roadway, but it is understood that roadway R may have any number of lanes. In an example embodiment, vehicle V is an autonomous vehicle and includes a control system 10 for controlling the operation thereof. Included in system 10 is a sensor network, discussed in greater detail below, which senses operating and/or positional characteristics of vehicle 10 as well as characteristics of the environment in which the vehicle V is located. The sensor network of system 10 may include sensors, cameras, radar, lidar, etc. resulting in system 10 having a field of view FOV in which lane markers and other objects are sensed, as shown in FIG. 1. Though field of view FOV is depicted in FIG. 1 as emanating forwardly from vehicle V having a triangular shape when viewed from above, it is understood that the field of view FOV of system 10 may emanate from vehicle V having different shapes and/or directions.

Figure 2:
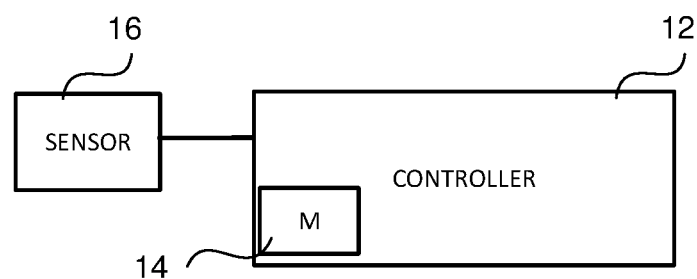
FIG. 2 is schematic block diagram of the control system in FIG. 1.

FIG. 2 illustrates a block diagram of control system 10 according to an example embodiment. System 10 includes a controller 12 which includes one or more processors, processing devices or the like for executing program code instructions stored in nonvolatile memory 14. Controller 12 may include a number of controllers or control units (not shown). Control system 10 may further include a sensor network 16 having sensors disposed around the vehicle including a plurality of sensors which detect various vehicle dynamic information of the vehicle. For instance, the sensors of sensor network 16 may measure the speed (lateral and longitudinal) and acceleration (lateral and longitudinal) of the vehicle.

It is understood that the particular structure and/or implementation of each of memory 14, sensor network 16 and controller 12 are well known such that a detailed description of each will not be provided herein for reasons of simplicity.

Figure 3:
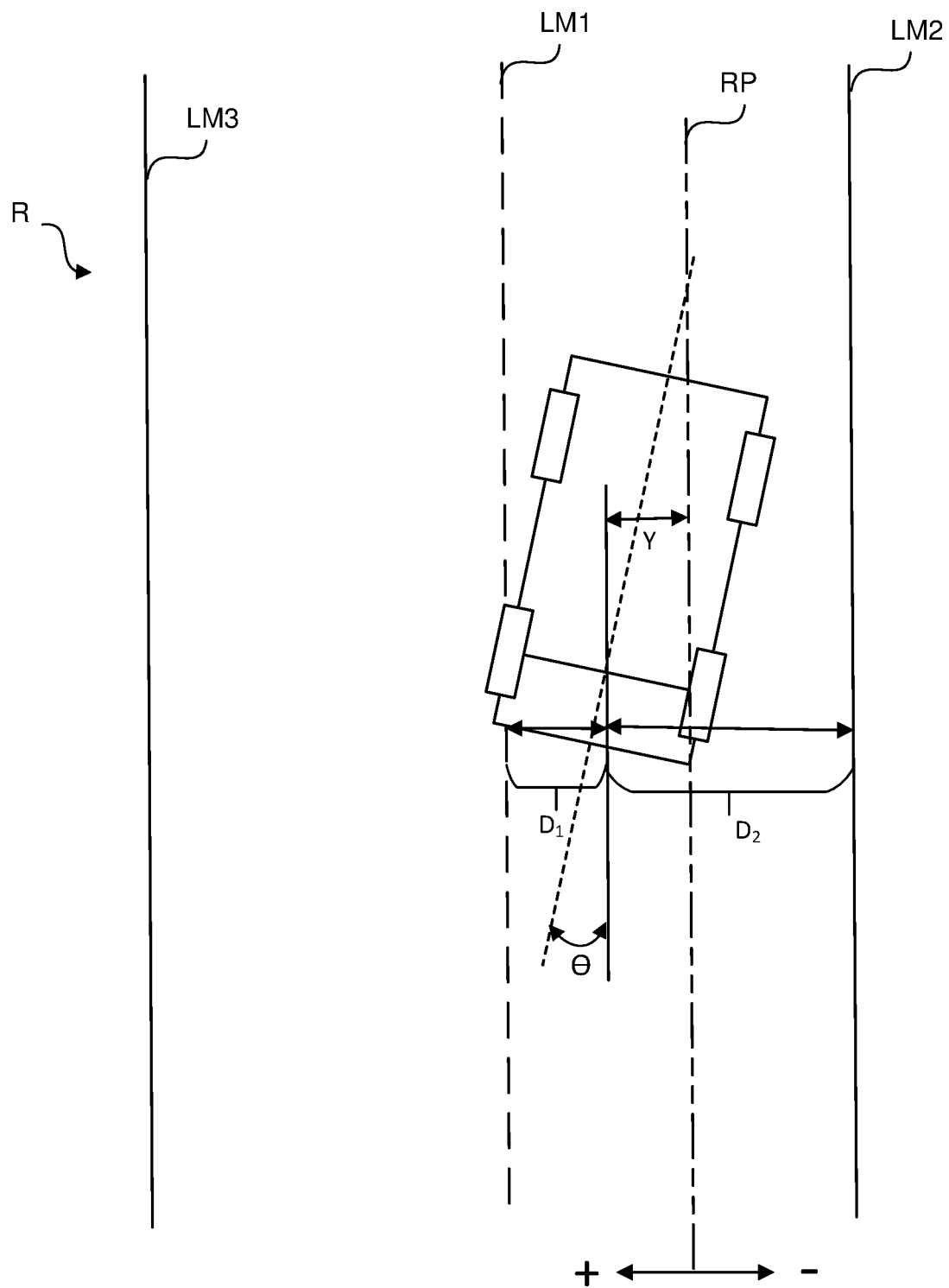
FIG. 3 is an overhead illustration of the vehicle of FIG. 1 on a straight portion of the roadway showing various operating parameters sensed by the vehicle, according to an example embodiment.
Figure 4:
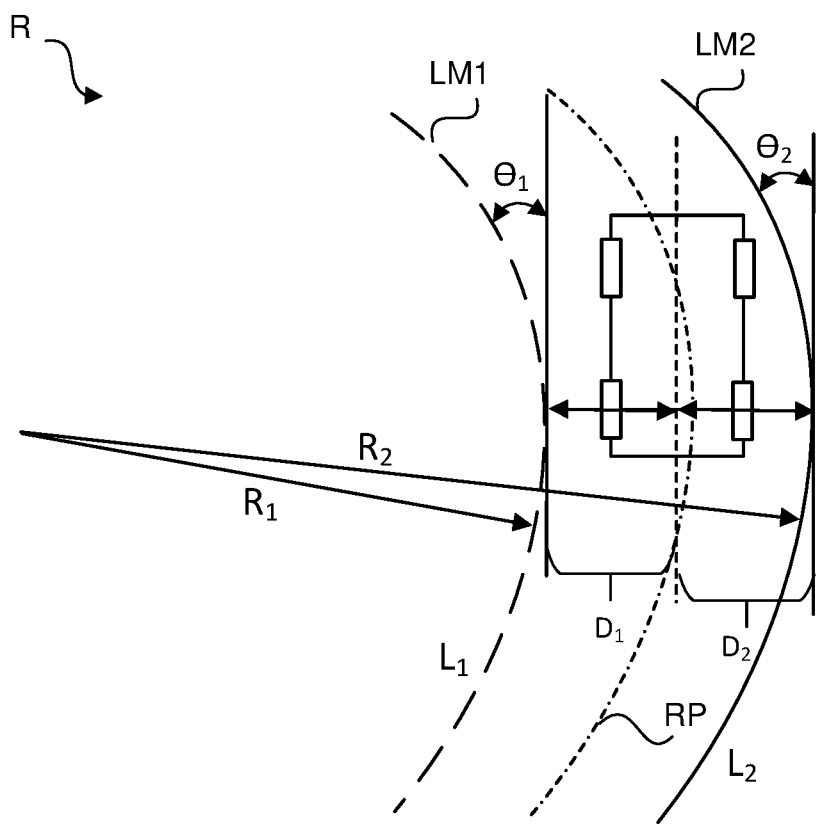
FIG. 4 is an overhead illustration of the vehicle of FIGS. 1 and 3 on a curved portion of the roadway showing the sensed operating parameters, according to an example embodiment.

In general terms, controller 12, when executing software stored in memory 14, is configured to receive sensed data pertaining to roadway R and pertaining to the operation and position of vehicle V, and to control the steering of vehicle R based upon such sensed data. In an example embodiment, controller 12 identifies lane markers LM of roadway R based upon the sensed data. Referring to FIGS. 3 and 4, controller 12 is able to identify at least lane markers LM1 and LM2 of roadway R. As shown in FIG. 3, lane markers LM1 and LM2 are on either side of vehicle V. With lane markers LM1 and LM2 identified, controller 12 determines a lateral distance d from a lateral center location of vehicle V to each lane marker LM1 and LM2. In an example embodiment, the lateral center location is a lateral center of vehicle V along the rear axle thereof. It is understood that the lateral center location may be in other locations along the longitudinal axis of vehicle V. With lane markers LM1 and LM2 identified, controller 12 determines lateral distance d1 to lane marker LM1 and lateral distance d2 to lane marker LM2 based upon the sensed data.

Controller 12 also determines a heading angle $\Theta$ relative to each lane marker LM. Heading angle $\Theta_x$ is the angle formed between the lane marker LM and the orientation of vehicle V. In this case, controller 12 determines heading angle $\Theta_1$ relative to lane marker LM1 and heading angle $\Theta_2$ relative to lane marker LM2. Further, controller 12 calculates the curvature of each lane marker LM, in instances in which lane markers LM1 and LM2 are curved. In this case, controller 12 calculates curvature C1 for lane marker LM1 and curvature C2 for lane marker LM2. Each curvature C may be calculated using the equation $$C=1/R,$$

where R is the radius of the curve for sensed portion of the corresponding lane marker LM. When lane markers LM are determined by controller 12 to be curved, controller 12 also calculates the length L of the curved portion of each lane marker LM1 and LM2.

Based upon the sensed data and lane marker determinations therefrom, controller 12 determines a reference path RP based upon the identified lane markers LM1 and LM2. In an example embodiment, reference path RP is the center of the lane in which vehicle V is disposed and which is bounded by lane markers LM1 and LM2. Reference path RP is depicted in FIGS. 3 and 4. Selecting the center between lane markers LM1 and LM2 results in lateral distance at reference path RP being lateral distance location zero, with the lateral distance increasing in magnitude the farther away from reference path RP. In an example embodiment, the lateral distance is viewed as being negative in one direction (to the right) from reference path RP and positive in the other (to the left), as shown in FIG. 3.

With reference path RP determined, controller 12 calculates the lateral distance y of vehicle V from reference path RP. In this case, lateral distance y is calculated as $$y=(d1+d2)/2,$$

where d1 and d2 are the lateral distances of vehicle V to lane markers LM1 and LM2, respectively, as discussed above. Further, the heading angle $\Theta$ of vehicle V relative to reference path RP is calculated as $$\Theta=(\Theta_1+\Theta_2)/2$$

where $\Theta_1$ and $\Theta_2$ are the heading angles of vehicle V relative to lane markers LM1 and LM2, respectively. Controller 12 calculates a heading angle error $e_\Theta$ and a lateral distance error $e_y$ based upon the lateral distance y and heading angle $\Theta$, respectively. Such error values are relative to desired and/or expected lateral positions and heading angle positions for vehicle V. Still further, the curvature Crv of reference path RP is calculated as $$Crv=(C1+C2)/2$$

where C1 and C2 are the curvatures of lane markers LM1 and LM2, respectively, as described above.

Figure 5:
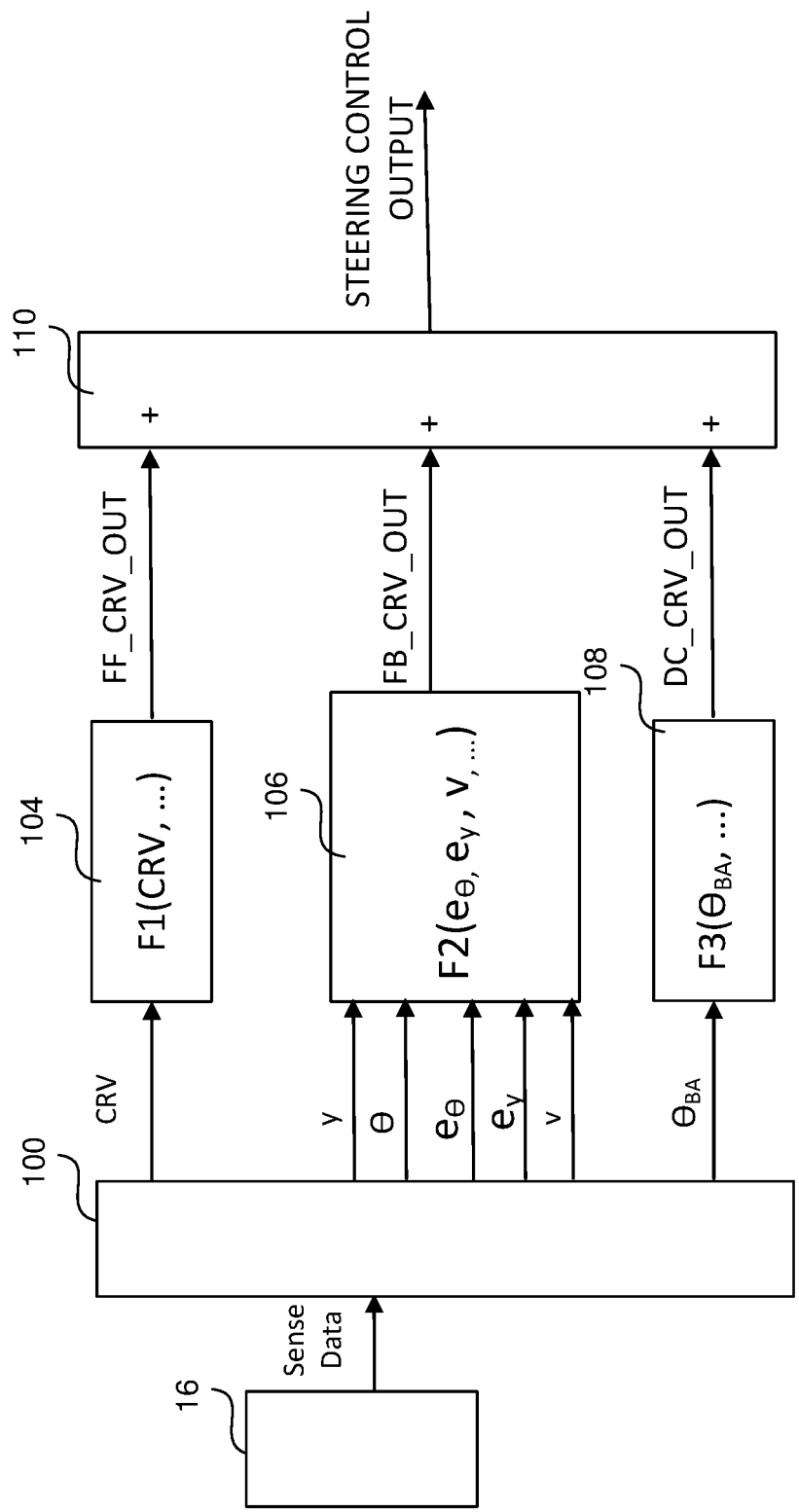
FIG. 5 is control block diagram illustrating the control function of the vehicle according to example embodiments.

Controller 12 determines a steering control output and/or command for controlling the steering of vehicle V based upon the determined characteristics of vehicle V relative to reference path 12 (velocity, heading angle $\Theta$, heading angle error $e_\Theta$, lateral distance y, lateral distance error $e_y$, and reference path curvature Crv). FIG. 5 illustrates a control diagram for generating the steering control output according to example embodiments. Sensor network 16 provides the sensed data to block 100 which calculates, based upon the sensed data, the curvature Crv, heading angle $\Theta$, lateral distance y, and banking angle $\Theta_{BA}$ of roadway R. The steering control output utilizes a nonlinear control function that is made up of a number of separate control functions F1-F3. The separate control functions F1, F2 and F3 may be generated by separate blocks 104, 106 and 108, respectively. In an example embodiment, blocks 100, 104, 106 and 108 may be software modules each of which is executed by at least one controller or processor unit of controller 12. In example embodiments, control function F1 is a feed forward control function, control function F2 is a feedback control function and control function F3 is a disturbance compensator control function. The output of control functions F1-F3 are combined in accumulator block 110 to generate the steering control output.

In example embodiments, feed forward control function F1 is based upon the curvature Crv of the reference path and in an example embodiment is calculated using the equation above. The disturbance compensator control function F3 is a function of the banking angle $\Theta_{BA}$ of roadway R and follows the equation $$F3(\Theta_{BA}) = g * \sin(\Theta_{BA})/v^2$$

wherein g is the gravitational force (9.8 m/s²) and v is the velocity of the vehicle V.

Control function F2, the feedback control function, is a nonlinear control function which is obtained by applying the Lyapunov direct method to a continuous steering vehicle model. In an example embodiment, feedback control function F2 follows the equation $$F2(e_y, e_\Theta, v) = (k1/v) * [(k2 * e_\Theta) + (k3 * e_y * \sin c(e_\Theta/\pi)) + (k4 * \sin(e_\Theta))]$$

where $e_y$ is the error of the lateral distance y; $e_\Theta$ is the error of the heading angle $\Theta$ as discussed above; k1-k4 are constant, tuned or tunable controller gain values associated with vehicle V; v is the velocity of vehicle V; and sin c(x) is the sampling function and is defined as $$\sin c(x) = \sin(x)/x$$

as is known in the art.

In another example embodiment, control function F2 follows the equation $$F2(e_y, e_\Theta, v) = (k1/v) * [(k2 * e_\Theta) + k3 * e_y * \exp(-(e_\Theta/\pi)^2) + (k4 * \sin(e_\Theta))]$$

where $e_y$ is the error of the lateral distance y; $e_\Theta$ is the error of the heading angle $\Theta$; k1-k4 are constant, tuned or tunable controller gain values associated with vehicle V; v is the velocity of vehicle V; and exp(x) is the exponential function as is known in the art.

In another example embodiment, control function F2 follows the equation $$F2(e_y, e_\Theta, v) = (k1/v) * [(k2 * e_\Theta) + (k3 * e_y * \cos(e_\Theta/2)) + (k4 * \sin(e_\Theta))]$$

where $e_y$ is the error of the lateral distance y; $e_\Theta$ is the error of the heading angle $\Theta$; k1-k4 are constant, tuned or tunable controller gain values associated with vehicle V; v is the velocity of vehicle V; and cos(x) and sin(x) are the cosine and sine functions as known in the art.

In yet another example embodiment, control function F2 follows the equation $$F2(e_y, e_\Theta, v) = (k1/v) * [(k2 * e_\Theta) + k3 * e_y * (1 - abs(e_\Theta/\pi)) + (k4 * \sin(e_\Theta))]$$

where $e_y$ is the error of the lateral distance y; $e_\Theta$ is the error of the heading angle $\Theta$; k1-k4 are constant, tuned or tunable controller gain values associated with vehicle V; v is the velocity of vehicle V; and abs(x) is the absolute value function as known in the art.

Controller gain values k1-k4 may be the same among the above control functions F2 described above, or they may be different from one control function F2 to another.

In another example embodiment, control function F2 utilizes function g(x) defined as $$g(e_x) = (kp * e_x) + (kd * (de_x/dt)) + ki * \int e_x(t)dt$$

where kp, kd, and ki are constant, tuned or tunable controller gain values associated with vehicle V. Control function F2 uses this function g(x) as $$F2(e_y, e_\Theta, v) = (1/v) * [g(e_y) + g(e_\Theta)]$$

where $e_y$ is the error of the lateral distance y; $e_\Theta$ is the error of the heading angle $\Theta$; and v is the velocity of vehicle V. This control function F2 is intended for use by a controller which is somewhat closer to a proportional integral derivative (PID) controller.

As can be seen, feedback control functions F2 described above may be more generally described as $$F2(e_y, e_\Theta, v) = (k1/v) * [(k2 * e_\Theta) + f2(e_y, e_\Theta) + (k4 * \sin(e_\Theta))]$$

where $f2(e_y, e_\Theta)$ is a control subfunction which may vary depending upon the particular implementation of feedback control function F2. As described above, control subfunction f2 may be a sin c function, an exponential function, a cosine function or an absolute value function.

The operation of controller 12 will be described with reference to FIG. 6. Initially, controller 12 receives at 50 sensed data from sensor network 16. The sensed data includes data captured in the field of view FOV of one or more sensors in sensor network 16, including data relating to lane markers LM1 and LM2. Controller 12 identifies at 52 lane markers LM1 and LM2 from the sensed data received. With lane markers LM1 and LM2 identified, controller 12 determines at 54 the reference path RP. In example embodiments, the reference path RP is calculated as being half the distance between lane marker LM1 and lane marker LM2. It is understood, however, that the reference path RP may be at different locations between lane marker LM1 and lane marker LM2. At 56, controller 12 calculates the curvature C1 of lane marker LM1 and curvature C2 of lane marker LM2, and then calculates at 58 the feed forward control output using feed forward control function F1 described above.

Controller 12 calculates the lateral position y of vehicle V at 60 and the heading angle $\Theta$ of vehicle V at 62, as described above. In addition, controller 12 calculates lateral position error $e_y$ and heading angle error $e_\Theta$ based upon the calculations at steps 60 and 62, respectively. Next, the feedback control output is generated at 64 using feedback control function F2 as described above.

Controller 12 determines the banking angle $\Theta_{BA}$ of roadway R at step 66. With the determination of banking angle $\Theta_{BA}$ of roadway R, the disturbance compensator output is calculated at 68 using the disturbance compensator function F3 as described above. With the feed forward control output, the feedback control output and the disturbance compensator output generated, the steering control output is generated at 70 by summation. The steering of vehicle V is controlled by use of the steering control output at 72.

Figure 6:
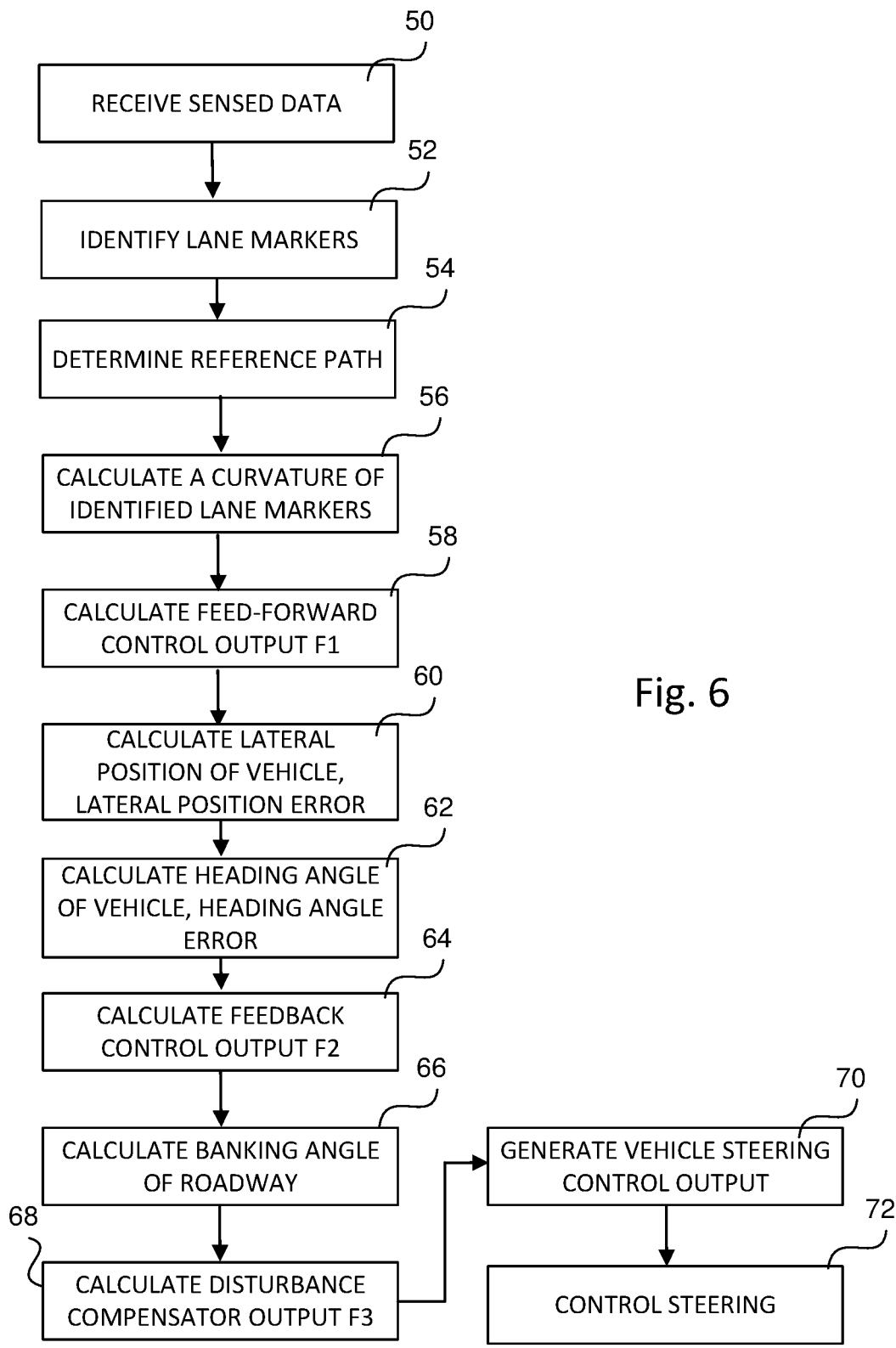
FIG. 6 is a flowchart illustrating the operation of the control system of FIG. 2, according to example embodiments.

With respect to the flowchart of FIG. 6, it is understood that steps 50-72 may be performed in a different order. Some steps may be performed in parallel just as shown in FIG. 5.

The example embodiments discussed advantageously allows relatively smaller computational requirements in calculating the vehicle steering control output. In addition, the example embodiments require a relatively small number of controller gains (k1-k4; or $kp_y$, $kd_y$, $ki_y$, $kp_\Theta$, $kd_\Theta$ and $ki_\Theta$) for the vehicle V.

In an example embodiment, controller 12 possesses artificial intelligence, self-learning and/or self-adapting capabilities. Controller 12 may use artificial intelligence, self-learning and/or self adapting algorithms or techniques performing one or more of steps 50-72, such as identifying lane markers LM1 and LM2. In this regard, symbolic rules and/or neural networks may be utilized for making such determinations and identifications.

The example embodiments described above are directed to autonomous vehicles and the steering thereof. It is understood that the example embodiments may also be used in driver controlled vehicles or vehicles which have some amount of autonomous control capability less than fully autonomous control.

The example embodiments address automatic lane centering, automatic lane changes within straight or curved roads; and provides a solution to automatically steering a vehicle based upon sensor information and providing position and orientation of the vehicle with respect to the road. The example embodiments read data coming from sensors about the orientation and lateral position of the vehicle, and such data is used to compute a control command that the vehicle executes to reach the desired/target orientation and lateral position of the vehicle. Example embodiments use a Lyaponuv method to create a nonlinear control law and can be tuned in much less time as compared to existing methods.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A method of controlling a vehicle on a roadway, comprising:
   receiving vehicle sensed data relating to the operation of the vehicle, the vehicle sensed data including a sensed velocity of the vehicle;
   identifying a first lane marker and a second lane marker of the roadway based upon the sensed data;
   determining a reference path for the vehicle based at least in part upon the first and second lane markers;
   calculating a feed-forward control output based at least in part upon a curvature of the first lane marker and a curvature of the second lane marker;
   calculating a lateral position of the vehicle relative to the reference path based at least partly upon the vehicle sensed data, and a lateral position error based upon the lateral position;
   calculating a heading angle of the vehicle relative to the reference path based at least partly upon the vehicle sensed data, and a heading angle error based at least partly upon the heading angle;
   calculating a feedback control output using a nonlinear control function which is based at least partly upon the lateral position error, the heading angle error, and the sensed velocity of the vehicle;
   generating a vehicle steering control output based upon the feed-forward control output and the feedback control output, the vehicle control output for steering the vehicle;
   autonomously steering the vehicle based at least partly upon the vehicle steering control output; and
   wherein the feedback control output follows a feedback control function F2 according to $$F2=(k1/v)*[(k2*e_\Theta)+f2(e_\Theta,e_y)+(k4*\sin(e_\Theta))]$$

where k1, k2 and k4 are gain parameters of the vehicle, $\Theta$ is the heading angle, $e_\Theta$ is the heading angle error, y is the lateral position of the vehicle, $e_y$ is the lateral position error, v is the velocity of the vehicle, and f2 is a control subfunction of the feedback control output F2.

2. The method of claim 1, further comprising:
   calculating a banking angle of the roadway based upon the vehicle sensed data; and
   calculating a disturbance compensator output based upon the banking angle calculated,
   wherein generating the vehicle steering control output is based upon the disturbance compensator output.

3. The method of claim 2, wherein the disturbance compensator output follows a disturbance compensator control function F3 according to $$F3(\Theta_{BA},v)=g*\sin(\Theta_{BA})/v^2,$$

wherein g=9.8 m/s$^2$, $\Theta_{BA}$ is the banking angle, and v is the velocity of the vehicle.

4. The method of claim 1, further comprising calculating a curvature C1 of the first lane marker and a curvature C2 of the second lane marker, wherein the feed-forward control output follows a feed forward control function F1 according to the equation $$F1=(C1+C2)/2.$$

5. The method of claim 1, wherein the control subfunction f2 follows the equation $$f2=k3*e_y*\exp[-(e_\Theta/\pi)^2]$$

where k3 is a gain parameter of the vehicle.

6. The method of claim 1, wherein the control subfunction f2 follows the equation $$f2 = k3 * e_y * \cos\left(\frac{e_e}{2}\right),$$

where k3 is a gain parameter of the vehicle.

7. The method of claim 1, wherein the control subfunction f2 follows the equation $$f2 = k3 * e_y * \text{sinc}\left(\frac{e_e}{\pi}\right),$$

Where k3 is a gain parameter of the vehicle and sinc $$\left(\frac{e_e}{\pi}\right) = \sin\theta/\theta.$$

8. The method of claim 1, wherein the control subfunction f2 follows the equation $$f2=k3*\Theta_y*(1-\text{abs}(e_\Theta/\pi)),$$

where k3 is a gain parameter of the vehicle and abs is an absolute value operation.

9. The method of claim 1, wherein the control subfunction f2 is at least one of an exponential function of the heading angle error, a cosine function of the heading angle error, a sinc function of the heading angle error, and an absolute value function of the heading angle error.

10. The method of claim 1, wherein the feedback control output follows a feedback control function F2 according to $$F2=(1/v)*[g(e_y)+g(e_\Theta)],$$

where $\Theta$ is the heading angle, $e_\Theta$ is the heading angle error, y is the lateral position of the vehicle, $e_y$ is the lateral position error, v is the velocity of the vehicle, and g(x) follows the equation $$g(x)=(kp*x)+(kd*dx/dt)+(ki*\int x(t)dt),$$

where kp, kd, and ki are gain parameters associated with the vehicle.

11. A software product stored in non-transitory memory having instructions which, when executed by a processor, causes the processor to:
receive vehicle sensed data relating to the operation of the vehicle, the vehicle sensed data including a sensed velocity of the vehicle;
identify a first lane marker and a second lane marker of the roadway based upon the sensed data;
determine a reference path for the vehicle based at least in part upon the first and second lane markers;
calculating a feed-forward control output based at least in part upon a curvature of the first lane marker and a curvature of the second lane marker;
calculate a lateral position of the vehicle relative to the reference path based at least partly upon the vehicle sensed data, and a lateral position error based upon the lateral position;
calculate a heading angle of the vehicle relative to the reference path based at least partly upon the vehicle sensed data, and a heading angle error based at least partly upon the heading angle;
calculate a feedback control output using a nonlinear control function which is based at least partly upon the lateral position error, the heading angle error, and the sensed velocity of the vehicle;
generate a vehicle steering control output based upon the feed-forward control output and the feedback control output, the vehicle control output for steering the vehicle;
autonomously steer the vehicle based at least partly upon the vehicle steering control output; and
wherein the feedback control output follows a feedback control function F2 according to $$F2=(1/v)*[q(e_y)+g(e_\Theta)],$$

where g(x) follows the equation $$g(x)=(kp*x)+(kd*dx/dt)+(ki*\int x(t)dt),$$

where kp, kd, and ki are gain parameters associated with the vehicle, and v is the velocity of the vehicle.

12. The software product of claim 11, further comprising instructions which, when executed by the processor, causes the processor to:
calculate a banking angle of the roadway based upon the vehicle sensed data; and
calculate a disturbance compensator output based upon the banking angle calculated,
wherein the instructions for generating the vehicle steering control output is based upon the disturbance compensator output.

13. The software product of claim 12, wherein the disturbance compensator output follows a disturbance compensator control function F3 according to $$F3(\Theta_{BA},v)=g*\sin(\Theta BA)/v^2,$$

wherein $g=9.8$ m/s$^2$, $\Theta_{BA}$ is the banking angle, and v is the velocity of the vehicle.

14. The software product of claim 11, further comprising instructions which, when executed by the process, causes the processor to calculate a curvature C1 of the first lane marker and a curvature C2 of the second lane marker, wherein the feed-forward control output follows a feed forward control function F1 according to the equation $$F1=(C1+C2)/2.$$

15. The software product of claim 11, wherein the feedback control output follows a feedback control function F2 according to $$F2=(k1/v)*[(k2*e_\Theta)+f2(e_\Theta,e_y)+(k4*\sin(e_\Theta))]$$

where k1, k2 and k4 are gain parameters of the vehicle, $\Theta$ is the heading angle, $e_\Theta$ is the heading angle error, y is the lateral position of the vehicle, $e_y$ is the lateral position error, v is the velocity of the vehicle, and f2 is a control subfunction of the feedback control output F2.

16. The software product of claim 15, wherein the control subfunction f2 is at least one of an exponential function of the heading angle error, a cosine function of the heading angle error, a sinc function of the heading angle error, and an absolute value function of the heading angle error.

17. A system for controlling the steering of a vehicle along a roadway, comprising:
one or more first sensors sensing objects within a field of view of the vehicle, including a first lane marker and a second lane marker of the roadway;
one or more second sensors sensing an operation of the vehicle along the roadway; and
a controller coupled to the one or more first sensors and the one or more second sensors, the controller including instructions which, when executed, cause the controller to:
identify a first lane marker and a second lane marker of the roadway based upon the sensed data;
determine a reference path for the vehicle based at least in part upon the first and second lane markers;
calculate a feed-forward control output based at least in part upon a curvature of the first lane marker and a curvature of the second lane marker;
calculate a lateral position of the vehicle relative to the reference path based at least partly upon the vehicle sensed data, and a lateral position error based upon the lateral position;
calculate a heading angle of the vehicle relative to the reference path based at least partly upon the vehicle sensed data, and a heading angle error based at least partly upon the heading angle;
calculate a feedback control output using a nonlinear control function which is based at least partly upon the lateral position error, the heading angle error, and the sensed velocity of the vehicle;
generate a vehicle steering control output based upon the feed-forward control output and the feedback control output, the vehicle control output for steering the vehicle;
autonomously steer the vehicle based at least partly upon the vehicle steering control output; and
wherein the feedback control output follows a feedback control function F2 according to $$F2=(k1/v)*[(k2*e_\Theta)+f2(e_\Theta,e_\Theta)+(k4*\sin(e_\Theta))]$$

where k1, k2 and k4 are gain parameters of the vehicle, $\Theta$ is the heading angle, ee is the heading angle error, y is the lateral position of the vehicle, $e_y$ is the lateral position error, v is the velocity of the vehicle, and f2 is a control subfunction of the feedback control output F2, the control subfunction f2 being at least one of an exponential function of the heading angle error, a cosine function of the heading angle error, a sin function of the heading angle error, and an absolute value function of the heading angle error.

18. The system of claim 17, wherein the controller further includes instructions which, when executed by the controller, causes the controller to:
  calculate a banking angle of the roadway based upon the vehicle sensed data; and
  calculate a disturbance compensator output based upon the banking angle calculated,
  wherein the vehicle steering control output is based upon the disturbance compensator output.

* * * * *